United States Patent
Oneto et al.

(10) Patent No.: US 11,103,807 B2
(45) Date of Patent: Aug. 31, 2021

(54) PHASE SEPARATOR DEVICE FOR HYDROCARBON-CONTAMINATED AQUIFERS

(71) Applicant: YPF TECNOLOGÍA S.A., Ciudad Autónoma de Buenos Aires (AR)

(72) Inventors: María Elena Oneto, La Plata Pcia. de Buenos Aires (AR); Graciela Rojas, Berisso Pcia. de Buenos Aires (AR); Nuria Carolina Vidal, La Plata Pcia. de Buenos Aires (AR)

(73) Assignee: YPF Tecnologia S.A., Ciudad Autonoma de Buenos Aires (AR)

( * ) Notice: Subject to any disclaimer, the term of this patent is extended or adjusted under 35 U.S.C. 154(b) by 0 days.

(21) Appl. No.: 16/733,782

(22) Filed: Jan. 3, 2020

(65) Prior Publication Data

US 2020/0215459 A1    Jul. 9, 2020

Related U.S. Application Data

(60) Provisional application No. 62/788,067, filed on Jan. 3, 2019.

(51) Int. Cl.

| | |
|---|---|
| *C02F 1/40* | (2006.01) |
| *B01D 17/04* | (2006.01) |
| *B01D 39/10* | (2006.01) |
| *C02F 1/44* | (2006.01) |
| *B09C 1/00* | (2006.01) |
| *E21B 43/38* | (2006.01) |
| *C02F 101/32* | (2006.01) |

(52) U.S. Cl.
CPC ........... *B01D 17/045* (2013.01); *B01D 39/10* (2013.01); *B09C 1/002* (2013.01); *C02F 1/40* (2013.01); *C02F 1/44* (2013.01); *E21B 43/38* (2013.01); *B01D 2239/0428* (2013.01); *C02F 2101/32* (2013.01)

(58) Field of Classification Search
CPC .... C02F 1/40; C02F 2101/32; C02F 2101/06; B09C 1/002; B01D 17/045; E21B 43/38; E02B 15/10; E02B 15/106
USPC ........ 210/122, 170.05, 170.07, 242.1, 242.3, 210/747.7, 776; 405/128.15; 166/265
See application file for complete search history.

(56) References Cited

U.S. PATENT DOCUMENTS

| | | | |
|---|---|---|---|
| 3,667,608 A | 6/1972 | Burroughs et al. | |
| 3,670,896 A | 6/1972 | Hale, Jr. et al. | |
| 4,497,370 A * | 2/1985 | Breslin ................... | B09C 1/002 166/372 |
| 4,663,037 A * | 5/1987 | Breslin .............. | B01D 17/0214 210/170.07 |

(Continued)

FOREIGN PATENT DOCUMENTS

EP    2641642 B1    3/2017

OTHER PUBLICATIONS

Groundwater Remediation, www.submersiblepumpguide.com, pp. 1-32.
TR-515 F.A.P. Plus™ and TR-51640 F.A.P. Plus™ ZW Pump Systems, User Manual, Version 2.0, Durham Geo Slope Indicator, pp. 1-45.

(Continued)

*Primary Examiner* — Christopher Upton
(74) *Attorney, Agent, or Firm* — Muncy, Geissler, Olds & Lowe, P.C.

(57) ABSTRACT

A phase-separating device for hydrocarbon-contaminated aquifers comprising a support module comprising a central axis, a filter module operatively attached to the lower end of the central axis of the support module, an elastic module operatively attached to the filter module; and a reservoir module.

7 Claims, 14 Drawing Sheets

(56) References Cited

U.S. PATENT DOCUMENTS

| | | | | |
|---|---|---|---|---|
| 4,761,225 A | * | 8/1988 | Breslin | B09C 1/002 |
| | | | | 210/242.3 |
| 4,872,994 A | * | 10/1989 | Jakob | B01D 17/045 |
| | | | | 210/170.07 |
| 4,998,585 A | * | 3/1991 | Newcomer | B09C 1/002 |
| | | | | 210/242.3 |
| 5,207,897 A | * | 5/1993 | Baird | B09C 1/002 |
| | | | | 210/242.3 |
| 5,326,458 A | * | 7/1994 | Johnson | B09C 1/002 |
| | | | | 210/122 |
| 5,474,685 A | * | 12/1995 | Breslin | E21B 43/38 |
| | | | | 210/170.07 |

OTHER PUBLICATIONS

TR-252 Passive Skimmer and optional TR-253 2 inch Extension Canister Assembly and Installation Instructions, Durham Geo Slope Indicator, Jun. 5, 2007, pp. 1-4.

Geotech Sipper Pump & Skimmer Assembly, Installation and Operation Manual, Geotech Environmental Equipment, Inc., Apr. 24, 2017, pp. 1-40.

Geotech PRC Passive Skimmer, Oil Skimmers, Geotech Environmental Equipment, Inc., Jun. 28, 2018, pp. 1-2.

Product Recovery Canister, Installation and Operation Manual, Geotech Environmental Equipment, Inc., Jun. 29, 2018, pp. 1-24.

SOS SPG Skimmers, Operations Manual, QED Environmental Systems, Dec. 2007, pp. 1-55.

Product details—Skimmers, http://www.cornelsen.co.uk/Products/Active-LNAPL-Skimming/DGSI-Skimmer-Products.html, Cornelson Limited, pp. 1-2.

* cited by examiner

PHASE SEPARATOR DEVICE FOR HYDROCARBON-CONTAMINATED AQUIFERS

TECHNICAL FIELD OF THE INVENTION

The present invention relates to a device for phase separation in the oil industry. In particular, the present invention relates to a device comprising a support module, a filter module, an elastic module and a reservoir module for the separation of aqueous and oily phases in aquifers contaminated with hydrocarbons.

BACKGROUND OF THE INVENTION

In the oil industry area, contamination of underground aquifers by hydrocarbons represents an unwanted drawback due to its high environmental impact. The separation between a hydrocarbon-containing phase (oily phase) and a hydrocarbon-free phase (aqueous phase) is a characteristic common to several remediation processes of aquifers contaminated with hydrocarbons.

The separation and extraction of aqueous and oily phases from a mixture thereof can be based on mechanisms of water repulsion. Such mechanisms can be observed in natural organisms, such as a lotus leaf. Due to the microstructure and nanostructure of the lotus leaf, and in particular of its epidermis, its surface can "repel" both water droplets and residues.

Technical solutions to the problem of phase separation in contaminated aquifers can be provided using "bioinspired" or "biomimetic" materials.

On the other hand, there are devices in the prior art that allow the removal of oil and the recovery of bodies of water such as disclosed in U.S. Pat. No. 3,667,608 A which is related to a device consisting of a plastic tube wrapped with a layer of fibrous polyolefin that allows to sweep the surface of the area contaminated by an oil spill.

Additionally, U.S. Pat. No. 3,670,896 A is directed to a collection member coated on its surface with a material that is oleophilic and hydrophobic. Oil removal is carried out by adsorbing it to the surface of the collection member. Said collection member may be a roller that rotates on the surface of the oil-contaminated water or a conveyor belt that enters and exits the surface of the contaminated water.

Patent EP 2 641 642 B1 is directed to a device that comprises a collection chamber coated by a porous, oleophilic and hydrophobic layer that allows the obstruction of the water outside of said layer due to a high interfacial tension achieving that a small amount or none of the water enters and allowing oil to enter the chamber.

It should be noted that none of the aforementioned patent documents describe and/or suggest a device that can be used for the removal of oil in phreatimeter wells for the recovery of underground aquifers contaminated by hydrocarbons.

Consequently, there is a need to provide an alternative that allows separating the hydrocarbon-free phase of in contaminated aquifers in phreatimeter wells without generating aqueous effluents on the surface.

BRIEF DESCRIPTION OF THE INVENTION

The device of the present invention provides a solution to the contamination of aqueous phases by oily phases, by providing an efficient phase separation in a compact and portable device.

The device of the present invention enables a substantially hydrocarbon-free aqueous phase to be continuously extracted.

It is therefore an object of the present invention, a phase-separating device for hydrocarbon-contaminated aquifers comprising:
  a support module or support means comprising a central axis,
  a filter module or filter medium operatively attached to the lower end of the central axis of the support module,
  an elastic module or elastic medium operatively attached to the filter module; and
  a reservoir module or reservoir medium.

In a preferred embodiment, the device further comprises weights on its lower part.

In another preferred embodiment, the support module further comprises an outer cover.

In a preferred embodiment, the filter module comprises:
  an upper positioner and a lower positioner,
  a plurality of metal tubes whose ends are attached to the upper and lower positioners,
  a main filter comprising a floating body comprising a structure that houses a metal mesh, arranged between the plurality of metal tubes, and
  a primary collection duct of the main filter optionally comprising floats, to conduct the separated hydrocarbons towards the elastic module.

In a preferred embodiment, the main filter comprises a superhydrophobic membrane.

In another preferred embodiment, the upper and lower positioners comprise centering skids.

In a preferred embodiment, the reservoir module or reservoir means comprises:
  a top cover that keeps it linked to and in fluid communication with the primary collection duct of the filter module,
  a reservoir to store separate hydrocarbons.

In a preferred embodiment, the top cover is channeled so as to allow fluid communication between the reservoir and the interior of the plurality of metal tubes, so as to allow air flow from within the reservoir.

In a preferred embodiment, the elastic module comprises an element selected from a bellows, a hose and telescopic pipes joined with a seal and gasket.

DETAILED DESCRIPTION OF THE INVENTION

Figure 1:
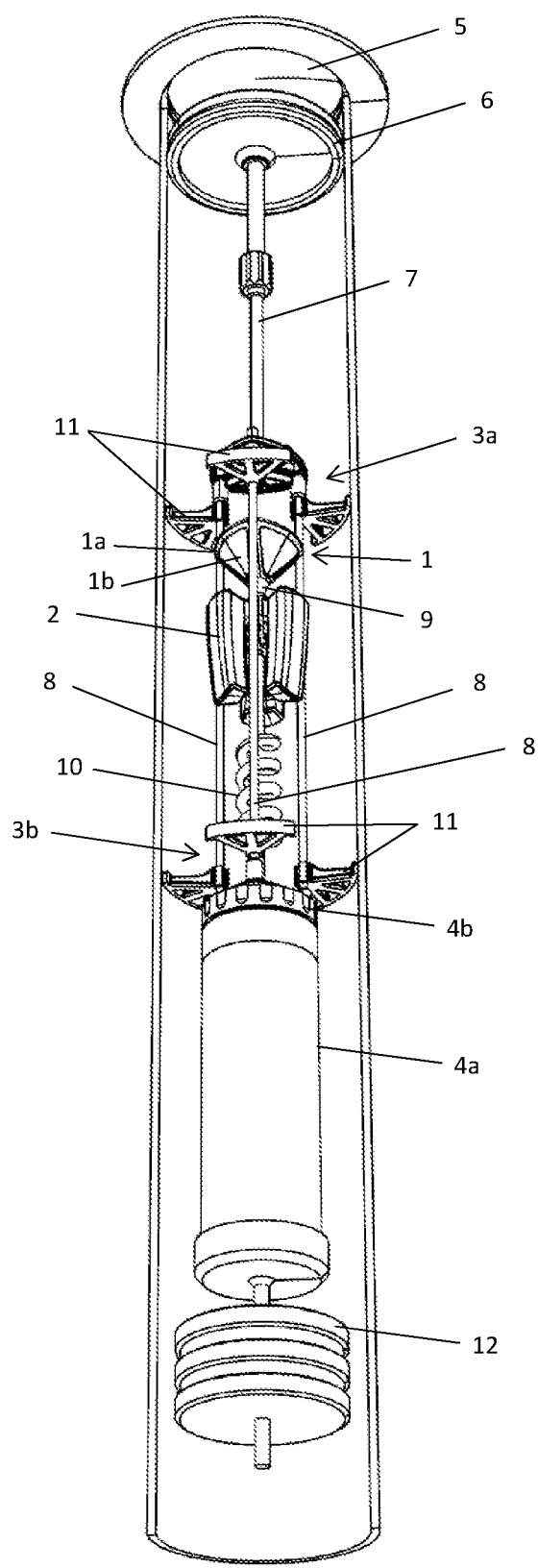
FIG. 1 shows a perspective view of the device of the present invention.
Figure 2:
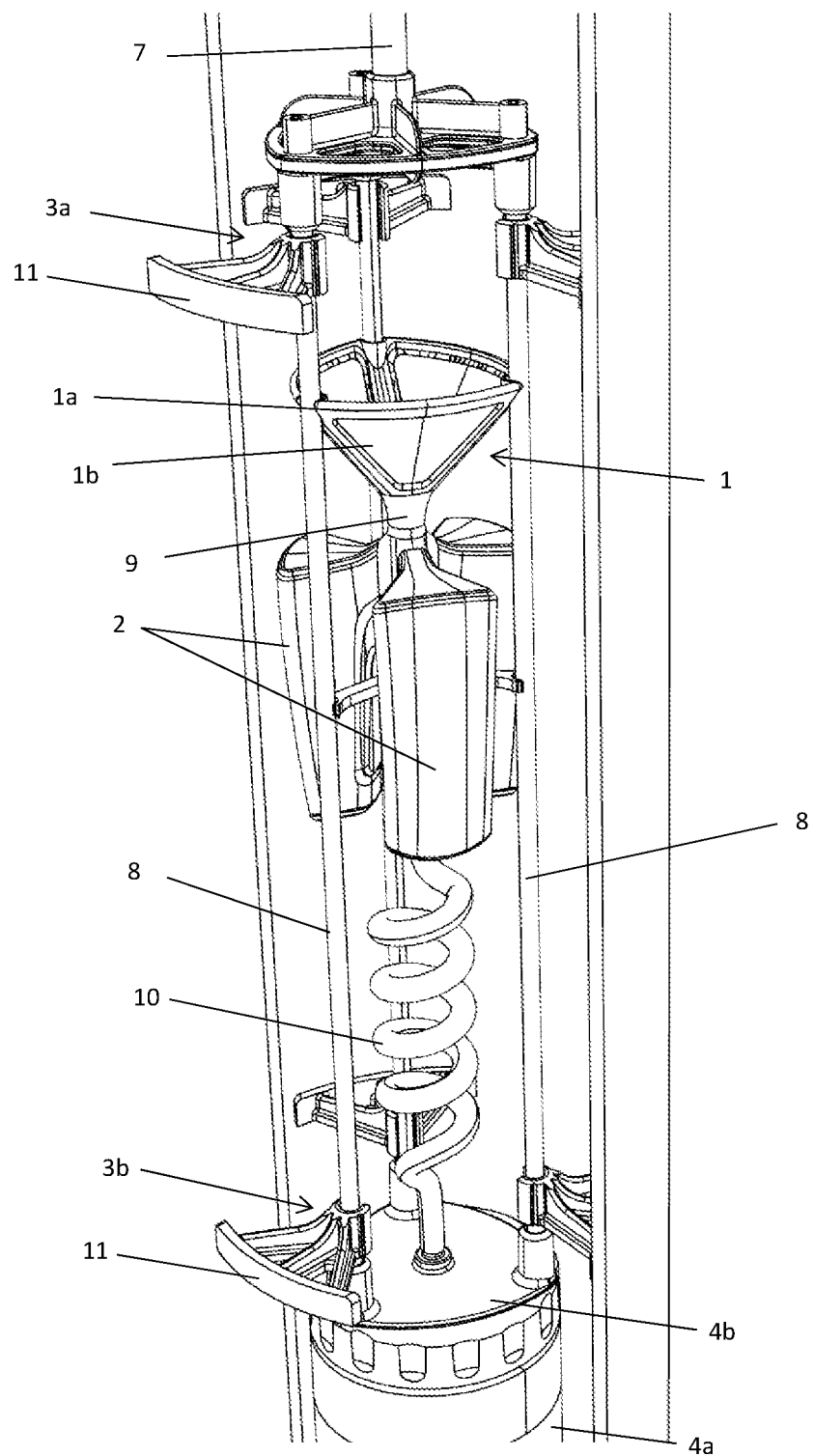
FIG. 2 shows a detailed view of the filter, elastic and reservoir modules of the device of the present invention.
Figure 3:
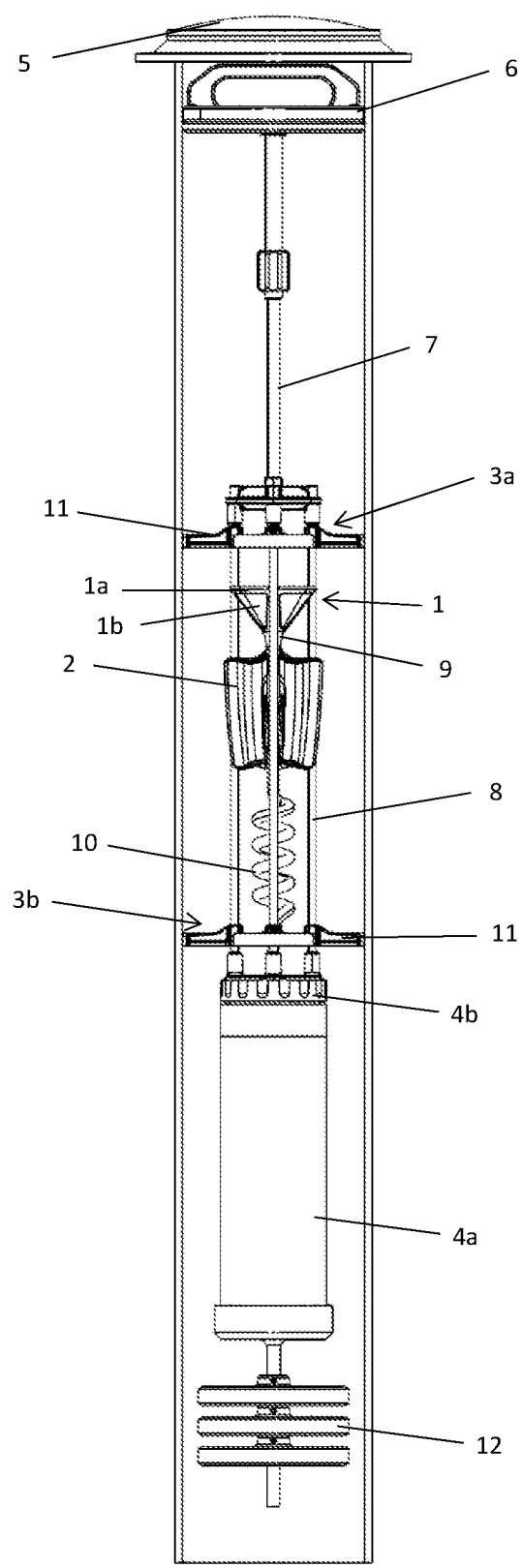
FIG. 3 shows a side view of an embodiment of the device of the present invention comprising weights at the bottom.
Figure 4:
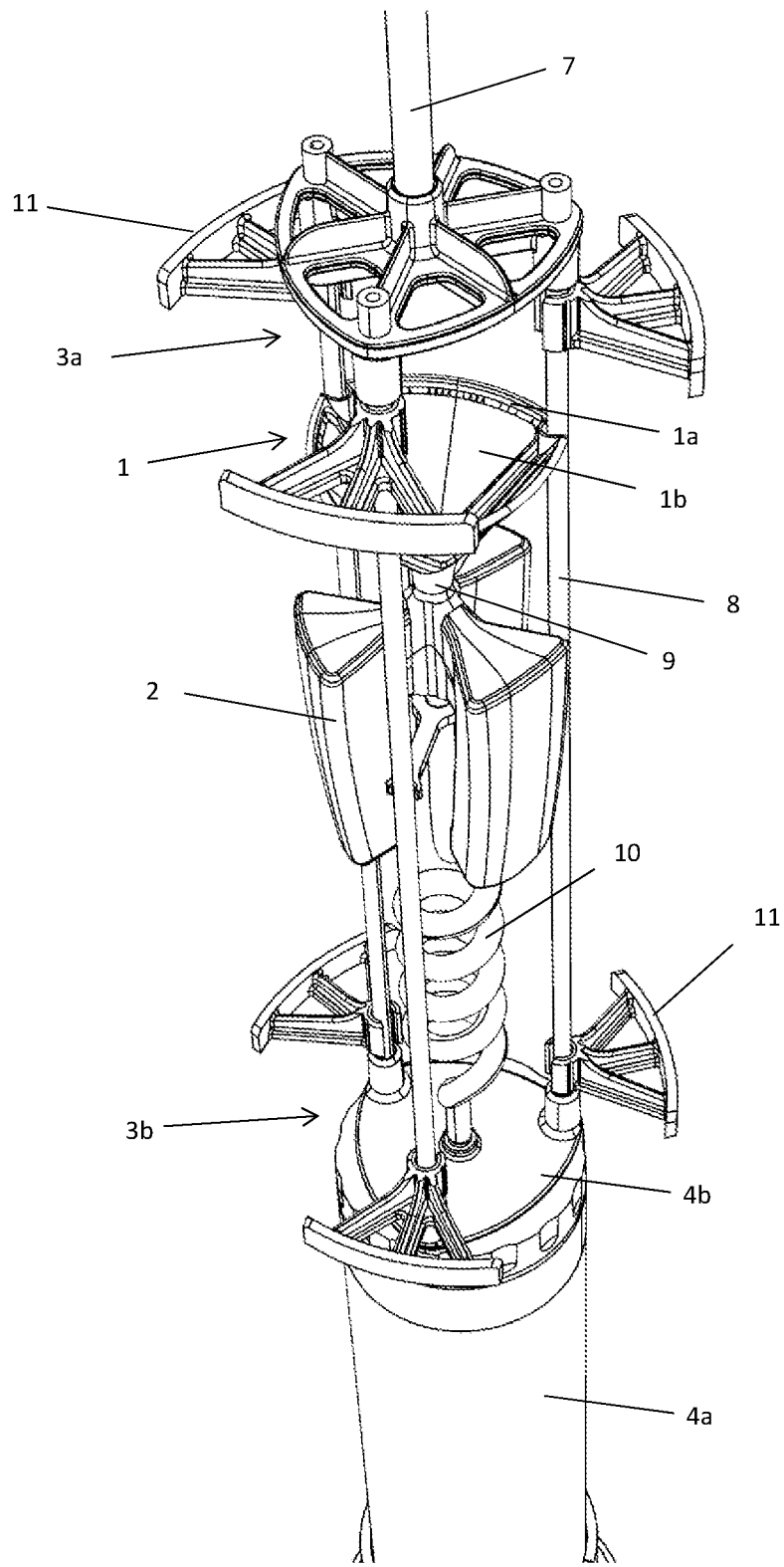
FIG. 4 shows an embodiment of the device of the present invention comprising centering skids.
Figure 5:
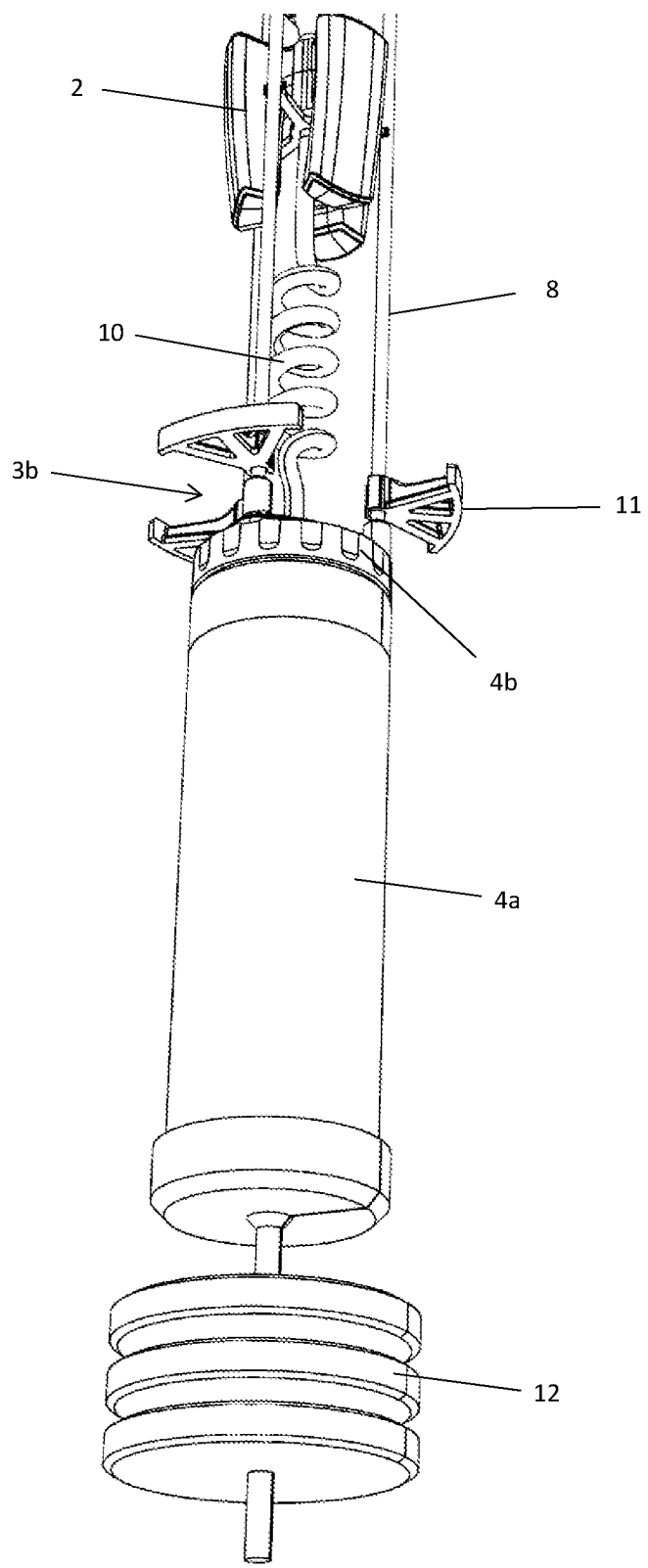
FIG. 5 shows an embodiment of the device of the invention comprising weights at the bottom.
Figure 6:
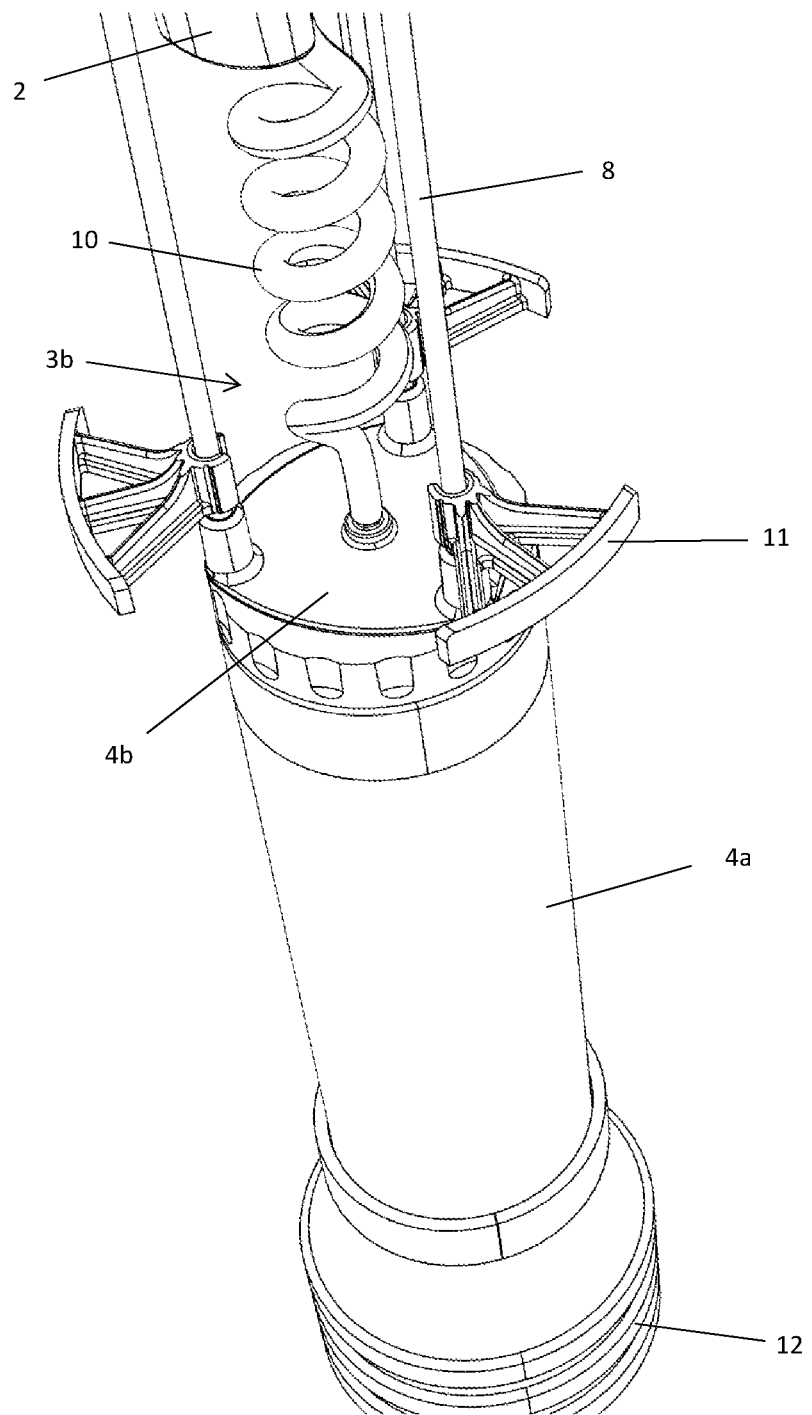
FIG. 6 shows a detailed view of the elastic and reservoir modules of an embodiment of the device of the present invention.
Figure 7:
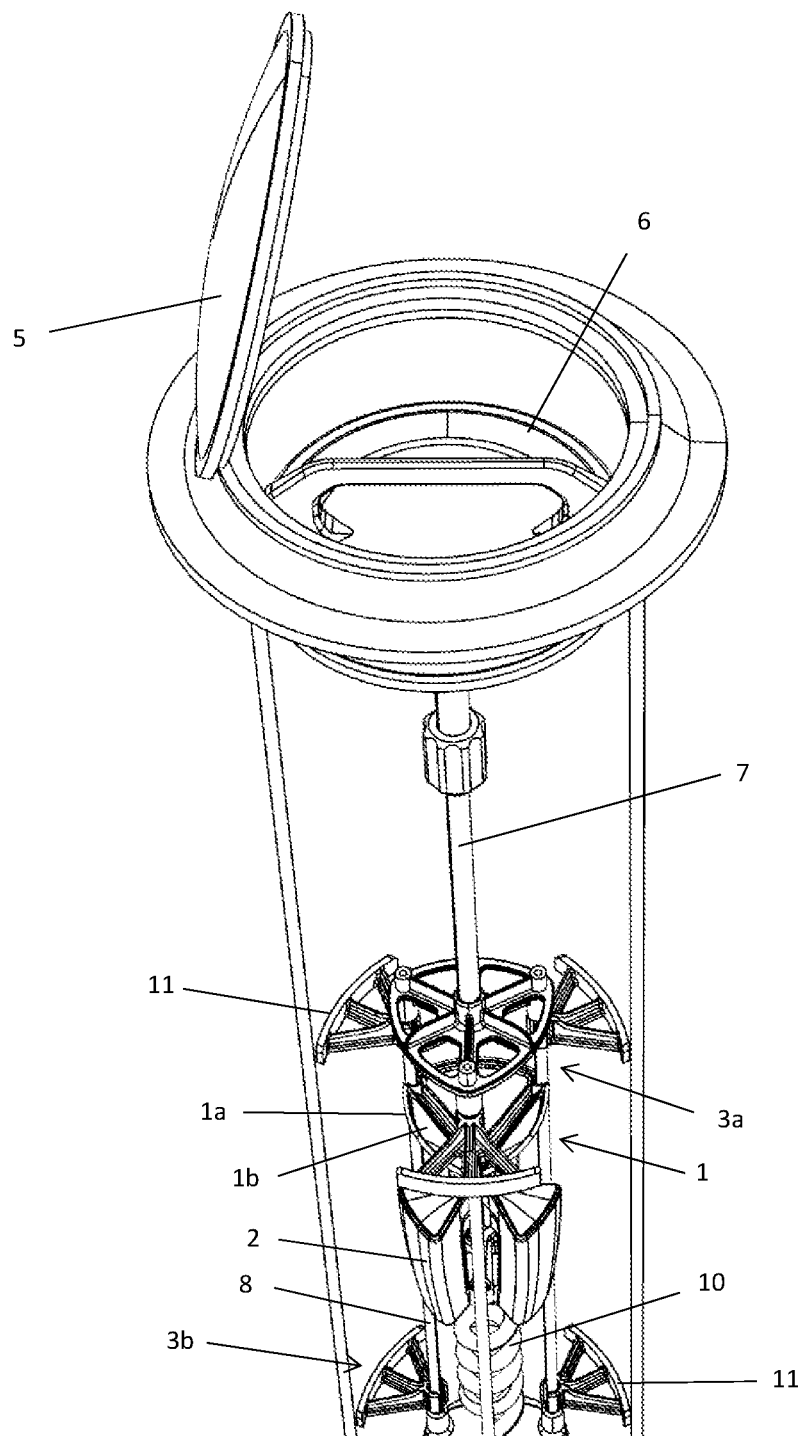
FIGS. 7 to 9 show an embodiment of the device of the present invention comprising an outer cover.
Figure 8:
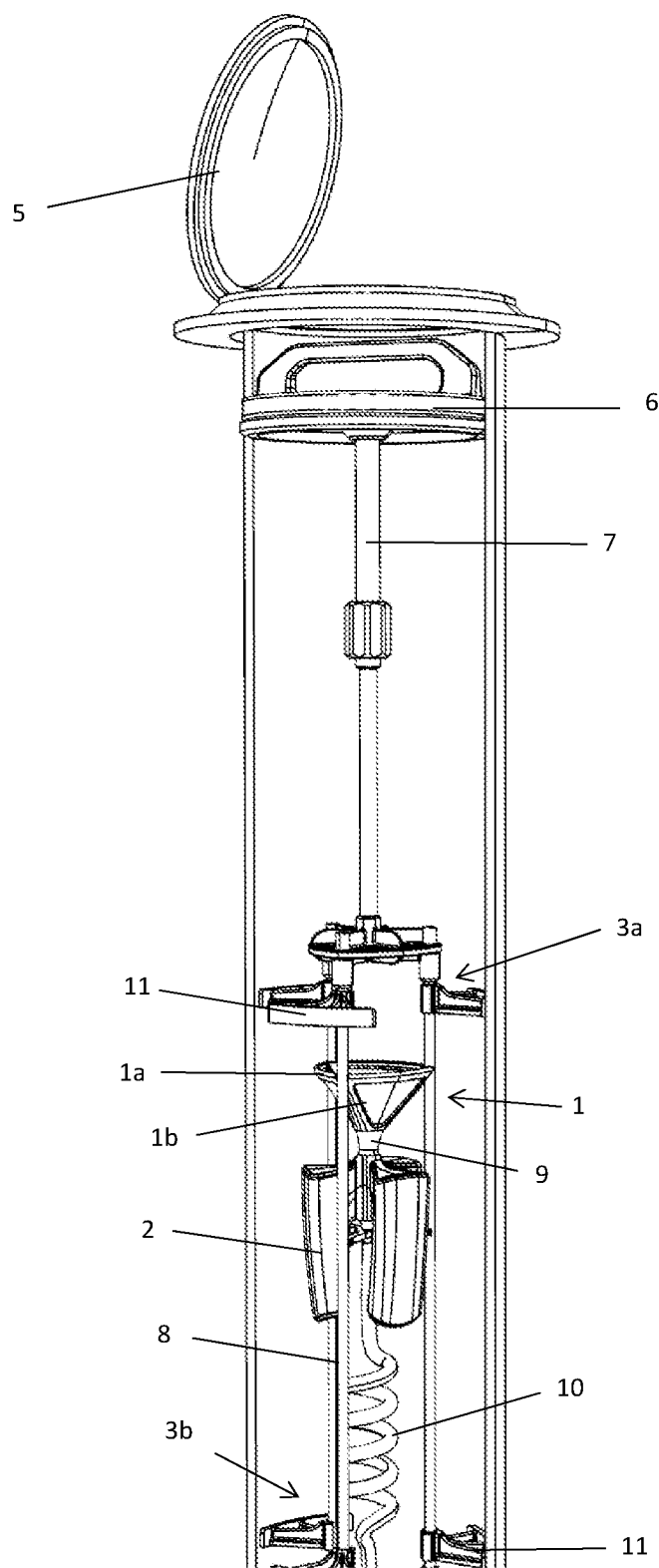
Figure 9:
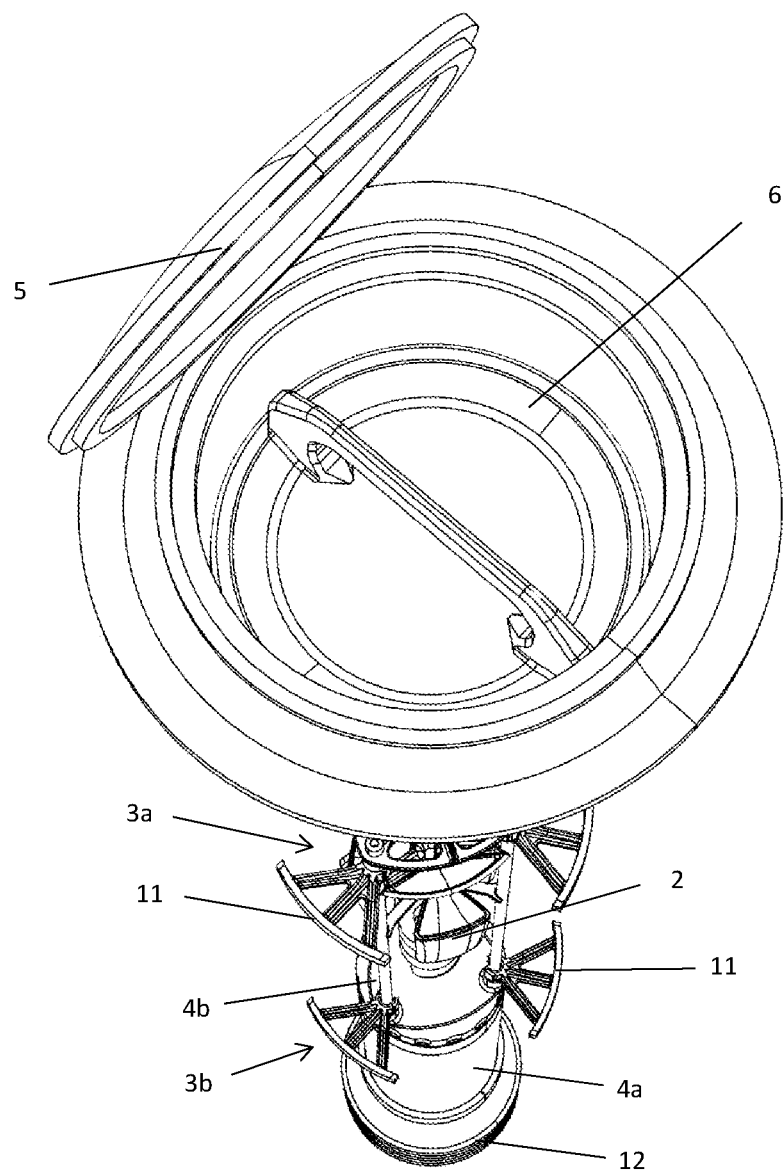
Figure 10:
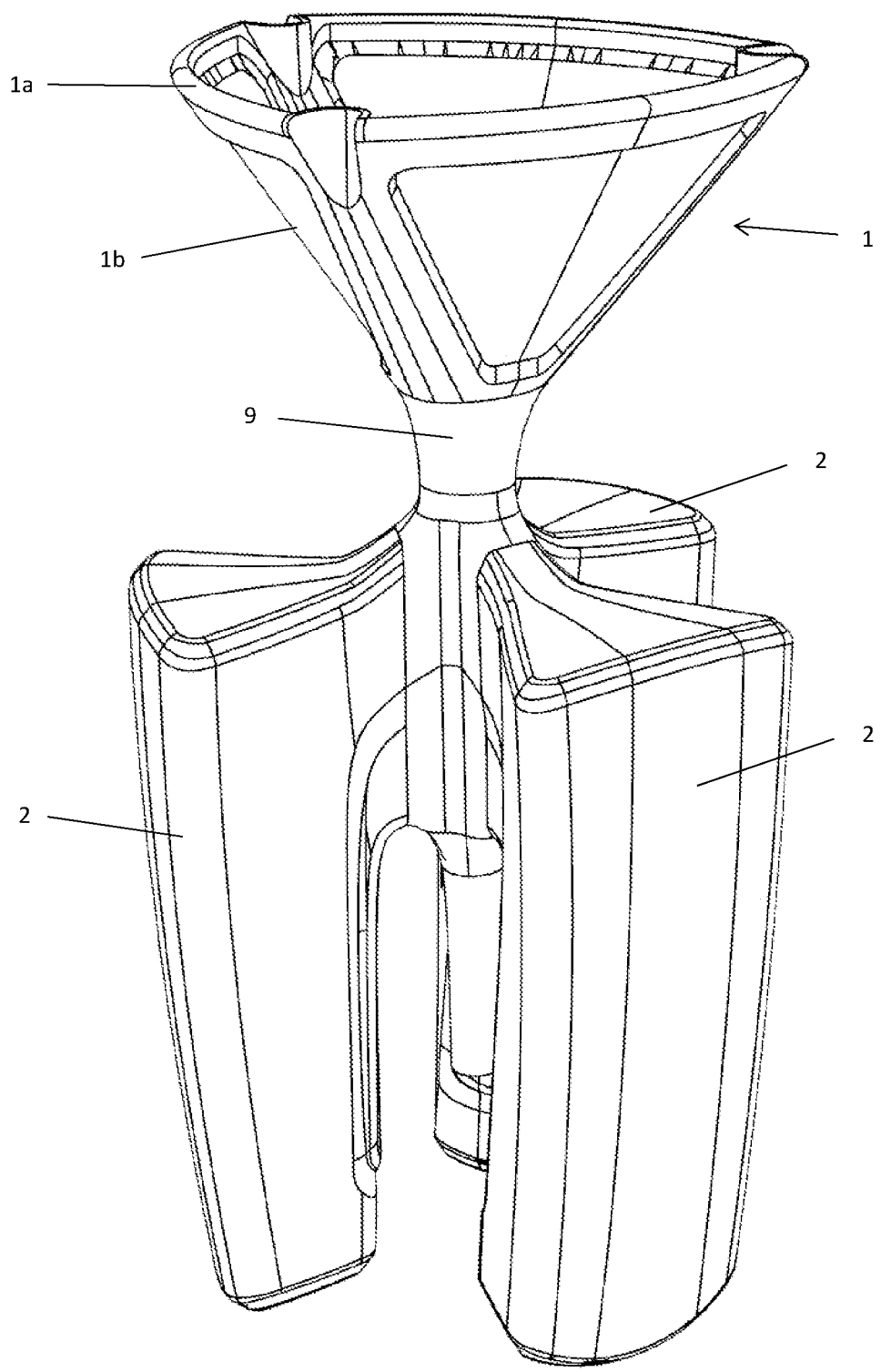
FIG. 10 shows a detail view of the filter module of the device of the present invention.
Figure 11:
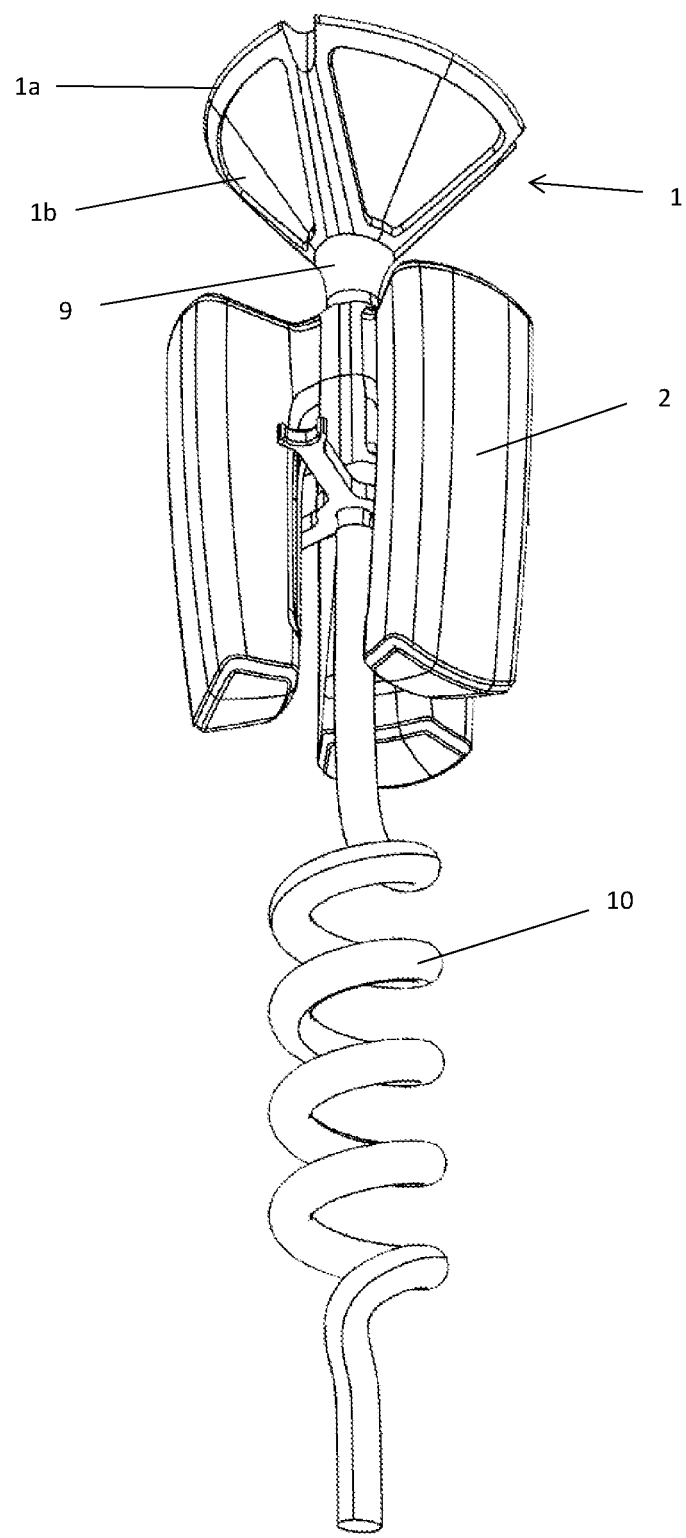
FIG. 11 shows a detailed view of the filter and elastic modules of the device of the present invention.
Figure 12:
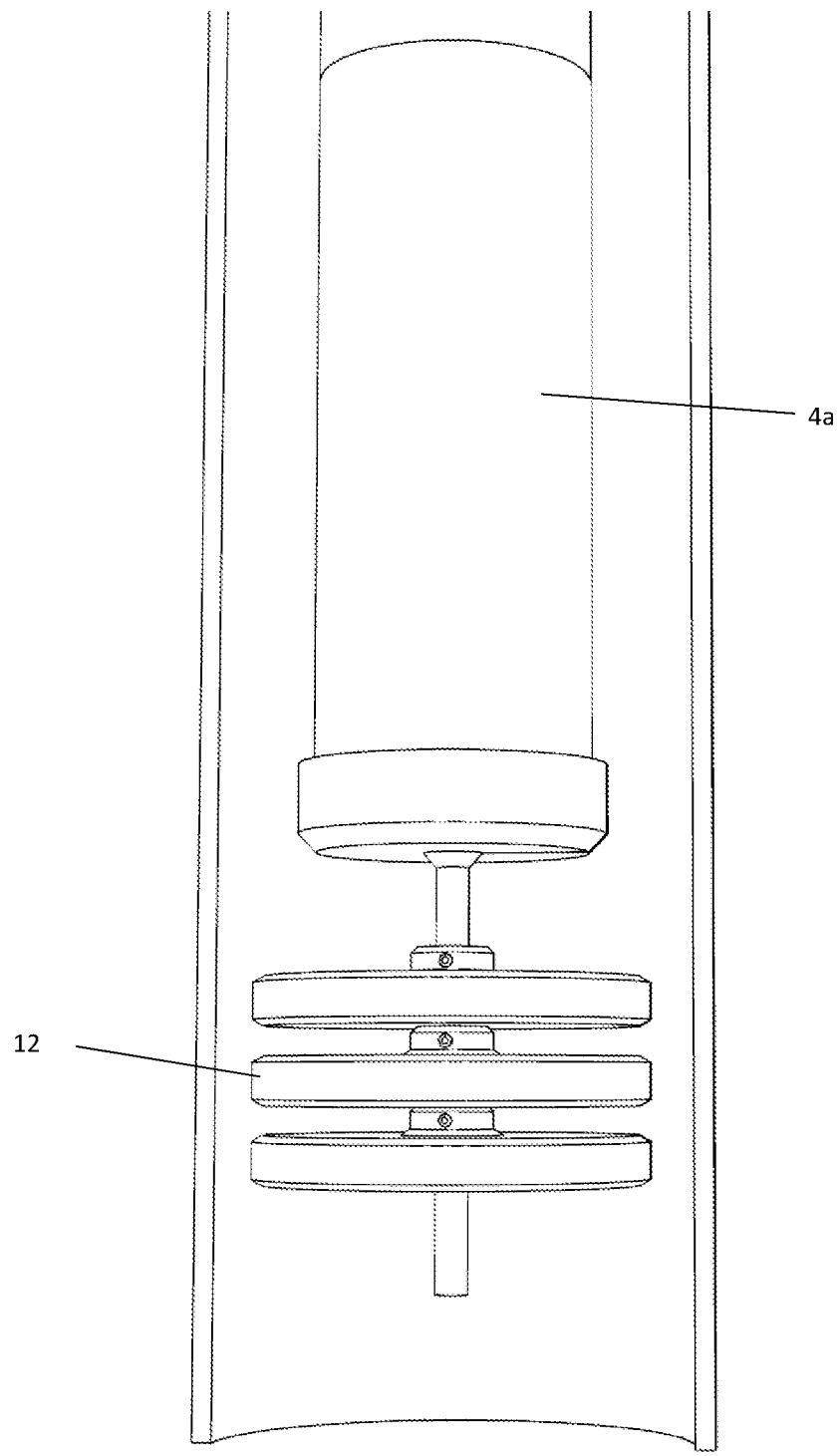
FIG. 12 shows a detail view of the reservoir module of an embodiment of the device of the present invention comprising weights at the bottom.
Figure 13:
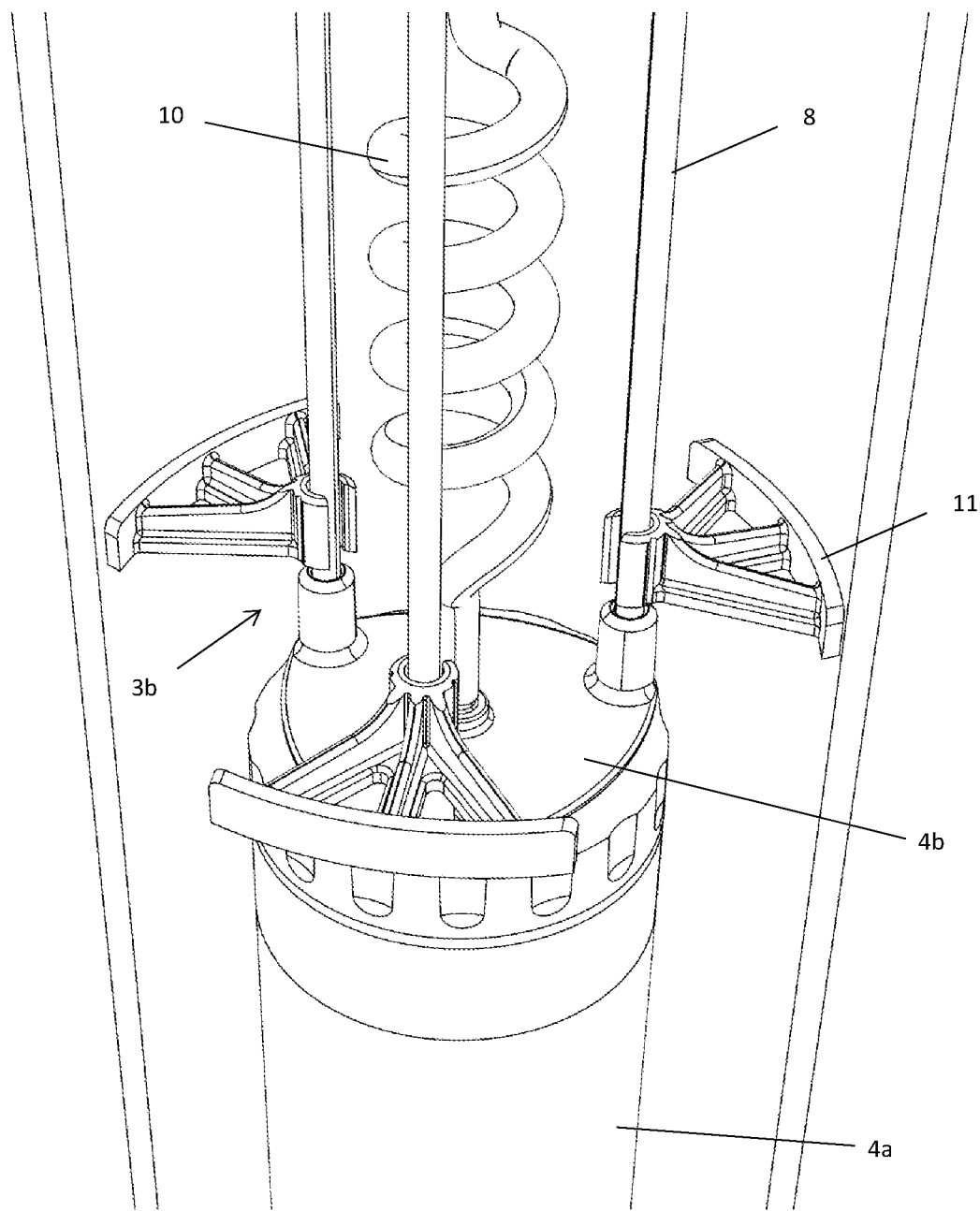
FIG. 13 shows a detail view of the reservoir module of an embodiment of the device of the present invention comprising centering skids.
Figure 14:
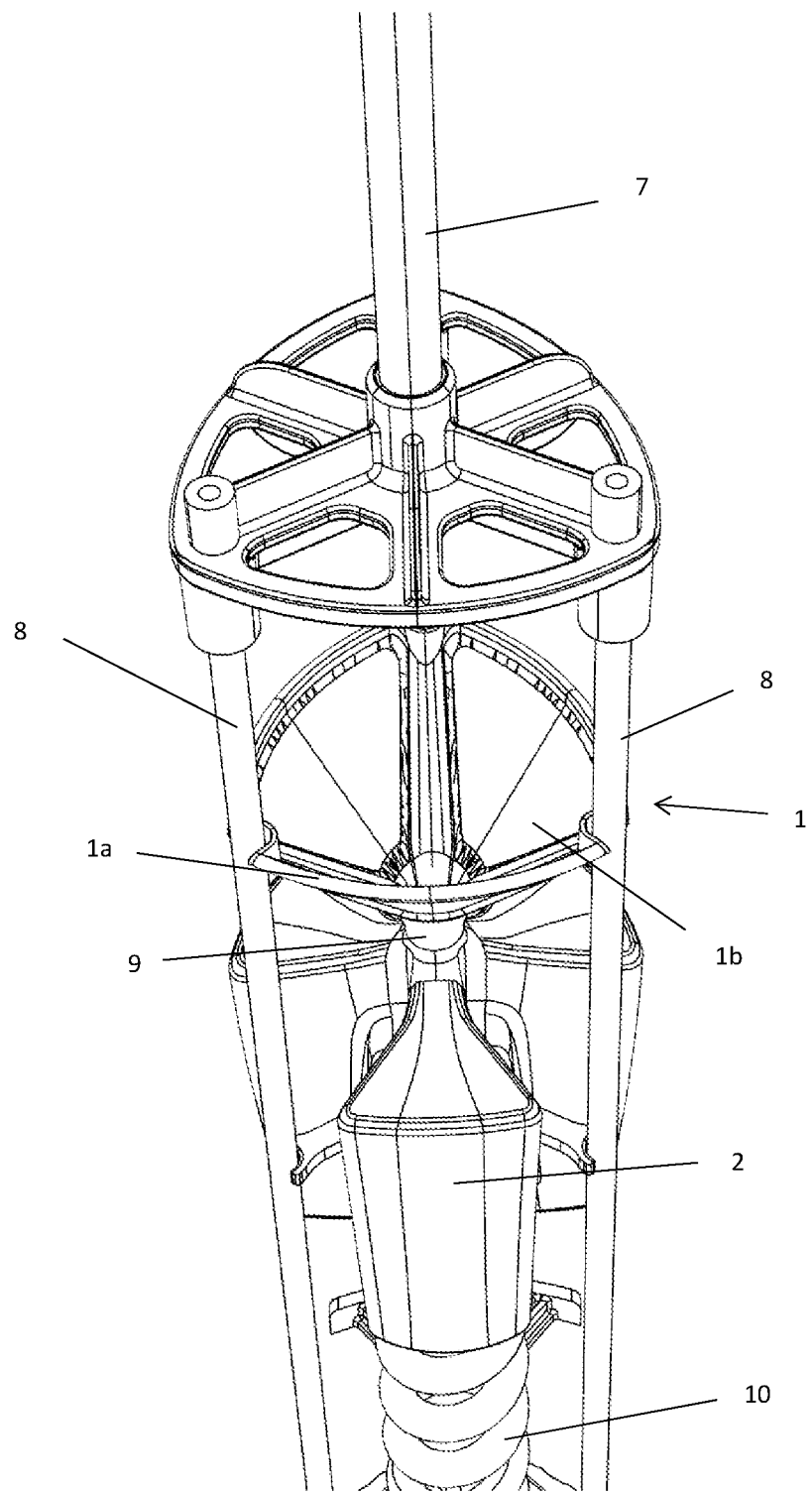
FIG. 14 shows a detailed view of the upper positioner, plurality of ducts and main filter of the filter module of the device of the present invention.

The device of the present invention will now be described in detail with reference to FIGS. 1 to 14, which illustrate, by way of example, preferred embodiments of the invention and the different elements thereof.

In each of the Figures the same numerical references are used to designate similar or equal elements of the device of the present invention.

For the purposes of the present invention, the terms "means" and "module" are used interchangeably so as to refer in both cases to an element or set of elements intended to perform and/or fulfill a certain function or purpose.

The device of the present invention allows passive or active collection of hydrocarbons derived from oil in aquifers, taking advantage of the fact that they generally accumulate on the surface of the ground-water table.

The device can be analyzed by identifying four modules: a support module, a filter module, an elastic module and a reservoir module.

These modules are contained in a linear structure made up of three tubes 8 linked to an upper positioner 3a and another lower positioner 3b. The latter is part of the cover 4b of the reservoir 4a. In this way, the filter module, consisting of a main filter 1 with floating body 1a and a plurality of floats 2, rises and falls contained in the linear structure according to the variation in the ground-water table. In a constant level situation or even in that movement generated by the level variation, the device collects hydrocarbons in the reservoir 4a.

The support module is that made up of the external cover 5 of the well. An upper centering ring 6 links a central axis 7 to the upper positioner 3a that contains the tube structure 8. The device is supported in a pendular or pendant manner from the central axis 7.

The filter module comprises a main filter 1 that has, as previously mentioned, a floating body 1a consisting of a basic geometry structure that houses a metal mesh 1b preferably of hydrophobic brass (copper and zinc alloy) that, through different nanotechnological treatments, makes up a super-hydrophobic mesh that when floating in the aquifer only allows the hydrocarbon to permeate, deriving it through the elastic module to the reservoir module for its final extraction.

The main filter 1 has in its lower part a primary collection duct 9 which is the one integrated into the floating body 1a of the main filter 1 that derives the hydrocarbon to an element 10, such as a hose or a bellows, which makes up the elastic module. In that primary duct 9 a plurality of floats 2 are located, preferably three of them located at 120 degrees composed of a hydrocarbon-resistant foam material. The floats 2 help to keep the main filter 1 stabilized avoiding situations of filter collapse or crossover in the well. Depending on the type of hydrocarbon to be collected, the floats 2 may be used or not and may be removed from the primary duct 9.

The floating body 1a of the main filter 1 has a piece made of a thermo-rigid or "shaped" material with triangular geometry so that inside the cylindrical pipe that constitutes the well, it can move freely between the tubes 8 that guide floating body, allowing the centering of the floating body 1a of the main filter 1 by means of the vertices of the triangle. The floating body 1a of the main filter 1 as previously mentioned houses the metal mesh 1b that allows separating the hydrocarbons from an aqueous phase.

The tubes 8 function as guides in small pipes, for example 2 to 2.5 inches, keeping the structure stable to guarantee that the floating body 1a of the main filter 1 is always in vertical axis to the pipe that makes up the well. When the diameter of the well is greater, for example 4, 6 or 8 inches, the device has centering skids 11 that are linked to the tubes 8 of the structure and allow adjusting the device dimension to the well, prolonging the vertices. These centering skids 11 are of great importance to keep the structure centered on the well, preventing the floating body 1a of the main filter 1 from collapsing and filtering water, a situation never desired. In this way, for the different dimensions of existing wells, the device allows keeping the structure always aligned with the axis of the well, thus ensuring its correct operation.

The elastic module must also absorb the variation in the ground-water table and allow the floating body 1a of the main filter 1, to which it is attached, the freedom to rise or fall when required by the variation. The element 10 that is used as an elastic module as previously mentioned can be a bellows, a hose or some telescopic pipes with seal and gasket. In each case, they are connected to the end of the primary duct 9 and to a spout of the cover 4b of the reservoir 4a to connect the three modules, that is, the filter module, the elastic module and the reservoir module, in the operation of the device of the present invention.

The reservoir module is made up of the upper cover 4b that keeps it linked to the structure and the reservoir 4a, which can be of different lengths according to the diameter of the well pipe, since this will determine the hydrocarbon volume to collect.

It should be noted that the reservoir of the device of the present invention can be internal (passive) if it is inside the well, as illustrated in the Figures, or external (active) if it is placed outside (not shown). Internal reservoir 4a requires that the collection of the recovered hydrocarbon contained in reservoir 4a, to be extracted by trained personnel, with permanent control over the collection. In passive reservoir 4a when the hydrocarbon volume completes the reservoir capacity, the system is saturated and stops collecting until reservoir 4a is replaced. In external deposits, the hydrocarbon is collected in a tank or reservoir located outside the well with pumping carried out by an electric pump.

The passive reservoir 4a has the possibility of placing weights 12 that help to send the empty reservoir 4a into the well, counteracting the (pushing) force exerted by the water on the reservoir 4a.

To guarantee the correct operation of the system, the air accumulated in the reservoir 4a will be displaced as the collection is carried out. In the passive reservoir 4a this air release is carried out through the interior of the three tubes 8 which preferably have an annular cross section and shape the structure of the filter module. This is achieved because the cover 4b of the reservoir 4a is channeled and communicated to the tubes 8.

The device is mounted on the wellhead, under the external cover 5 which is a component of the support module. In this way, the device is suspended from the structure to the central axis 7, leaving the tubes 8, the centering skids 11 and the upper positioner 3a and lower positioner 3b in a fixed position, while the main filter 1, the floats 2 and the element 10 (hose, bellows or telescopic tubes) will move on demand of the ground-water table.

According to the particular characteristics of each well, variations of the device of the present invention may be obtained included in the scope of the present description. By way of example, particular embodiments may be developed for treatments in fresh water, sea water, or production water, in turn modifying the properties of the main filter, for example its repulsion to water.

Likewise, sensors or integrated circuits based on the "Internet of Things" may be included to obtain automated or semi-automated operation of the device.

The present invention has applications in various areas of the oil industry. As an example, the device can be used in an aquifer remediation method that does not generate effluent dumping. Alternatively, it can be used as a spill containment device, generating an efficient and fast hydrocarbon recovery system. Furthermore, its use in surface facilities reduces the impact of crude oil and water treatment plants.

The present invention can be implemented directly in service stations and in the oil and gas industry facilities that have an impact on groundwater.

Example

An experimental test was carried out in a 22 ring well comprising a non-aqueous free phase with a thickness of approximately 10 cm, consisting essentially of light hydrocarbons, such as n-hexane, benzene, xylenes and toluene.

Experimental tests show that it is possible to recover a volume of 2 liters of said phase in approximately 1.5 min, resulting in a reduced time compared to similar devices in the prior art.

The invention claimed is:

1. A phase-separating device for hydrocarbon-contaminated aquifers, the device comprising:
a support module comprising a central axis,
a filter module operatively attached to a lower end of the central axis of the support module,
an elastic module operatively attached to the filter module; and
a reservoir module,
wherein the filter module comprises:
an upper positioner;
a lower positioner;
a plurality of metal tubes whose ends are attached to the upper positioner and the lower positioner;
a main filter comprising a floating body comprising a structure that houses a metal mesh, arranged between the plurality of metal tubes; and
a primary duct for collection of the main filter optionally comprising floats, to conduct the separated hydrocarbons towards the elastic module,
wherein the reservoir module comprises:
an upper cover that keeps the reservoir module, by means of the elastic module, linked to and in fluid communication with the primary collection duct of the filter module; and
a reservoir for storing separate hydrocarbons.

2. The device according to claim 1, further comprising weights in a lower part thereof.

3. The device according to claim 1, wherein the support module further comprises an outer cover.

4. The device according to claim 1, wherein the main filter comprises a hydrophobic membrane.

5. The device according to claim 1, wherein the upper positioner and the lower positioner comprise centering skids.

6. The device according to claim 1, wherein the upper cover is channeled so as to allow fluid communication between the reservoir and an interior of the plurality of metal tubes, so to allow air flow from inside the reservoir.

7. The device according to claim 1, wherein the elastic module comprises a hose.

* * * * *